United States Patent [19]
Brienza

[11] Patent Number: 4,961,588
[45] Date of Patent: Oct. 9, 1990

[54] RADIAL SEAL

[75] Inventor: Anthony R. Brienza, Orange, Calif.

[73] Assignee: Westinghouse Electric Corp., Pittsburgh, Pa.

[21] Appl. No.: 304,974

[22] Filed: Jan. 31, 1989

[51] Int. Cl.⁵ .......................... F16J 15/32; F27B 7/24
[52] U.S. Cl. .................................. 277/148; 277/152; 277/189; 277/192; 277/193; 277/227; 277/235 R
[58] Field of Search .................. 277/152, 35, 44, 192, 277/193, 227, DIG. 6, 212 C, 212 F, 212 R, 235 R, 148; 432/115

[56] References Cited

U.S. PATENT DOCUMENTS

| | | | |
|---|---|---|---|
| 2,171,049 | 8/1939 | Simmons | 277/193 X |
| 2,715,556 | 8/1955 | Prasse | 277/192 |
| 3,383,115 | 5/1968 | Eckley et al. | 432/115 X |
| 3,940,239 | 2/1976 | Rossi et al. | 432/115 |
| 4,111,439 | 9/1978 | Schmidt | 432/115 X |
| 4,601,475 | 7/1986 | Nicholson | 277/212 F X |

FOREIGN PATENT DOCUMENTS

| | | | |
|---|---|---|---|
| 3431990 | 3/1986 | Fed. Rep. of Germany | 277/152 |
| 887446 | 1/1962 | United Kingdom | 277/25 |

OTHER PUBLICATIONS

"Rotary Kiln Seals—Effective Design Cuts Fuel Cost Appreciably" by Sam Webb, *Pit and Quarry*, Aug. 1975.

Primary Examiner—Allan N. Shoap
Attorney, Agent, or Firm—L. A. Aiello

[57] ABSTRACT

A heat resistent seal having a plurality of finger-like members (14) which press against the outer peripheral surface (23) of a rotating cylinder (16). The seal includes several seal sections (10), each comprising a thin spring steel plate (22) having a length in the range of about 30 cm to about 92 cm. Each section has a plurality of finger-like members (14) formed by making cuts (13) of about 5 cm in length along one edge (11) of the section (10). The seal sections are attached to a windbox (17) with the finger-like members (14) pressed against the rotating cylinder (16) of the rotary kiln. The finger-like members (14) of the seal are arranged to press against the outer peripheral surface (23) of the rotating cylinder (16) and apply a substantially even and constant force around the outer peripheral surface (23) of the rotating cylinder (16).

10 Claims, 3 Drawing Sheets

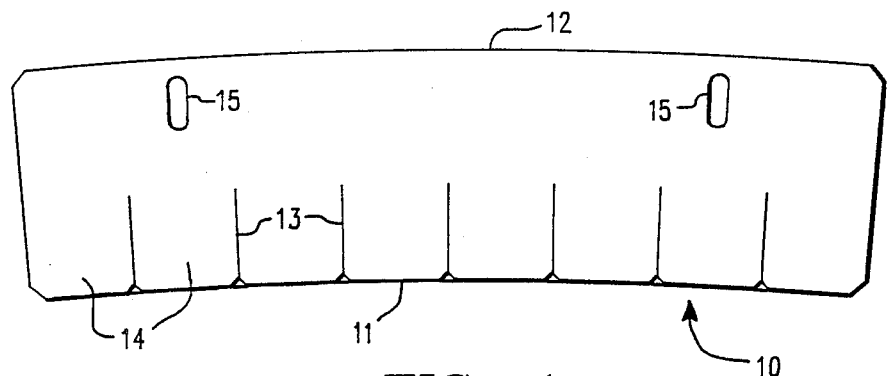
FIG. 1
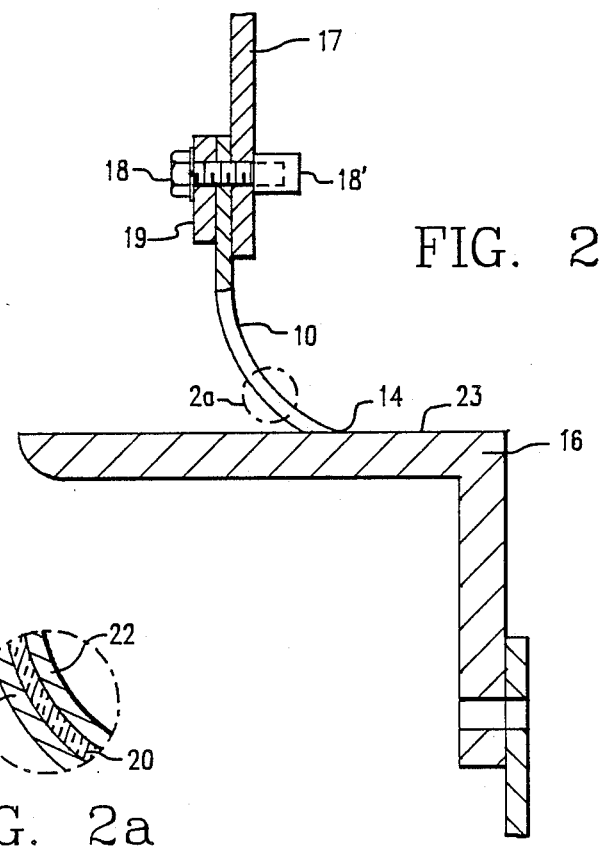
FIG. 2
FIG. 2a

RADIAL SEAL

BACKGROUND OF THE INVENTION

1. Field of the Invention.

The present invention relates to a radial seal, and more particularly, to a radial seal which provides a reasonable seal (not 100 percent) between a stationary windbox and a large diameter rotating cylinder, of a rotary kiln.

2. Related Art.

Radial seals are provided between a stationary windbox and large diameter rotating cylinder in rotating kiln devices. These radial seals are generally not employed for providing 100 percent air-tight seals. Rather, these seals are generally used as a barrier between hot air which surrounds the rotating cylinder and the cooler air existing in the environment in which the rotary kiln is operating. By providing a reasonable seal for preventing or hindering the escape of hot air from the vicinity of the rotating cylinder, a substantial amount of heat energy is conserved. Furthermore, by providing a barrier which inhibits air from escaping the rotary kiln device, such seals insure that enough air is maintained within the rotary kiln to allow combustion.

Known radial seals for use in rotary kilns include complex structures having several pads of heat resistant material (similar to brake shoes) mounted on spring devices. These pads are urged against the outer surface of the rotating cylinder of the rotary kiln by the force of the spring devices. The spring devices operate by compressing so as to allow the pads to conform to uneven cylinder surfaces and changes in the cylinder diameter. These known seals include relatively complex and expensive mechanical structures which are prone to mechanical malfunctions, are difficult to maintain and require complicated installation and replacement procedures. These known seals are problematic in many respects, primarily due to mechanical malfunctions arising from dirt and other particles which collect in the spring devices and between adjacent pads.

SUMMARY OF THE INVENTION

An object of the present invention is to provide a radial seal device which maintains a reasonable seal between a windbox and a rotating cylinder of a rotary kiln.

It is also an object of the present invention to provide a radial seal device which conforms to uneven outer peripheral surfaces of rotating cylinders.

It is also an object of the present invention to provide such a radial seal device that conforms to the outer peripheral surfaces of rotating cylinders which are not perfectly round in their cross section.

It is yet another object of the present invention to provide such a radial seal device which is relatively easy and inexpensive to manufacture, replace and maintain.

It is further an object of the present invention to provide such a radial seal device which is substantially resistant to mechanical failure.

These and other objects are accomplished according to the present invention by providing a heat resistant seal having a plurality of finger-like members which press against the outer peripheral surface of a rotating cylinder. In the illustrated embodiments of the present invention, the seal includes several seal sections, each of which comprises a thin substantially rectangular shaped spring steel plate, having a length along the long side thereof in the range of about 30 cm to about 92 cm. Each seal section is provided with a plurality of finger-like members formed by making cuts of about 5 cm in length along one edge of the section. In one embodiment, a layer of a flexible heat insulating material, such as a 60 mm layer of KAOWOOL (trademark), is sandwiched between two layers of the spring steel sections. The seal sections are attached to a windbox with the finger-like members pressed against the rotating cylinder of the rotary kiln. The flexibility of the spring steel plates, and the heat insulating material sandwiched therebetween, allows the seal to bend and press against the outer peripheral surface of the rotating cylinder. By virtue of their relatively small size and large number, the finger-like members apply a substantially even and constant force around the outer peripheral surface of the rotating cylinder. Moreover, the finger-like members may flex independently of one another so as to conform to, and constantly press against, an uneven or out-of-round peripheral surface of a rotating cylinder. In this manner, a constant reasonable seal is provided between the windbox and the outer peripheral surface of the rotating cylinder of a rotary kiln.

BRIEF DESCRIPTION OF THE DRAWINGS

The detailed description of the invention will be made with reference to the accompanying drawings, wherein like numerals designate corresponding parts in the several figures.

FIG. 1 shows a front view of a section of the radial seal according to an embodiment of the present invention.

FIG. 2 is a cross-sectional view showing a radial seal, according to an embodiment of the present invention, attached to a portion of a windbox and pressing against a portion of the outer surface of a rotating cylinder.

FIG. 2a is a cross-sectional view of the portion marked 2a in FIG. 2.

DESCRIPTION OF THE PREFERRED EMBODIMENTS

Figure 3:
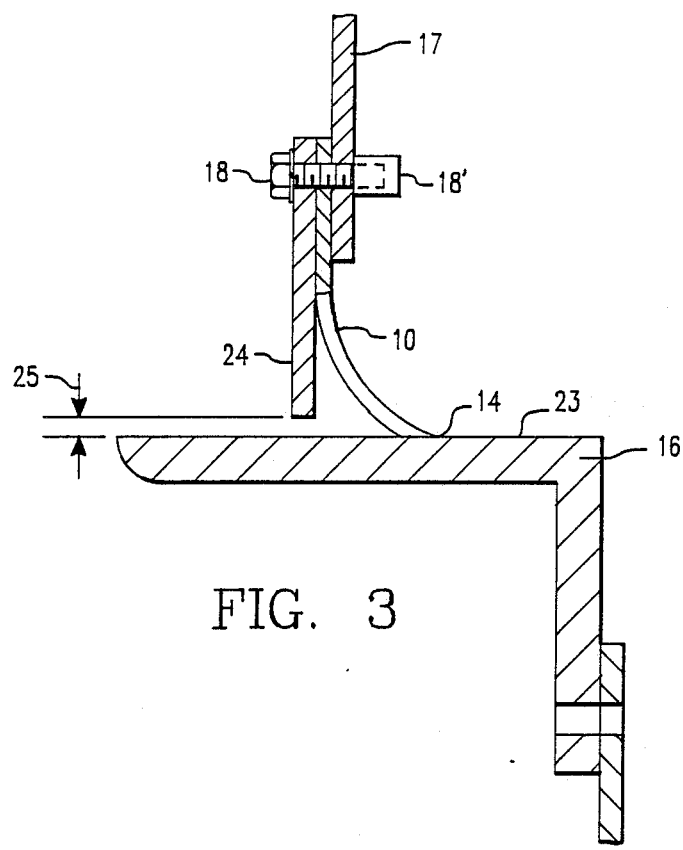
FIG. 3 is a cross-sectional view of another embodiment of a seal attached to a windbox and pressing against a rotating cylinder.

The following detailed description is of the best presently contemplated mode of carrying out the invention. The description is not to be taken in a limiting sense, but is made merely for the purpose of illustrating the general principles of the invention. The scope of the invention is best defined by the appended claims.

The radial seal device of the present invention provides a seal between a windbox and a large diameter rotating cylinder of a rotary kiln. In the illustrated embodiments, the radial seal does not provide a 100 percent air tight seal, but rather provides a reasonable (i.e., 90-95%) air and heat seal between the windbox and the rotating cylinder. While the embodiments described below provide for the seal to be attached to a stationary windbox and to press against a rotating cylinder, one of ordinary skill in the art will appreciate that the present invention can also be used as a seal attached to a rotating cylinder and pressing against a surface of a windbox.

In an embodiment of the present invention, the radial seal device comprises a skirt, or annular band, extending between the windbox and the rotating cylinder of a rotary kiln. The skirt, or annular band, is composed of several seal sections 10 which may be individually attached to the windbox to simplify installation. The seal sections 10, when attached end to end to the windbox, form a skirt or annular band extending between the windbox and the rotating cylinder.

In the embodiment shown in FIG. 1, each seal section 10 comprises a substantially rectangular shaped plate having two short sides and two long sides. The length of the short sides is chosen to be sufficiently greater than the distance between the windbox and the rotating cylinder so as to allow the seal sections to extend between the windbox and the rotating cylinder and bend in one direction, as will be discussed below. The length of the long side is within the range of approximately 24–50 cm. The long sides of the seal section 10, in the FIG. 1 embodiment, are arced (other embodiments may include substantially straight, long sides). As shown in FIG. 1, one long side 11 of the seal section 10 is provided with a concave arc, while the second long side 12 is provided with a convex arc which is substantially parallel to the concave arc of the side 11. The radius of the arc of the side 11 is dimensioned to be substantially equal to the average radius of the outer peripheral surface of the rotating cylinder (not shown in FIG. 1). Cuts, or slits, 13 are provided at predetermined intervals along the arced side 11. In the embodiment of FIG. 1, seven cuts 13, of approximately 5 cm in length, are provided approximately every 5 cm along the arced side 11. The cuts 13 extend from the edge of the side 11 in a direction substantially perpendicular to the side 11. By virtue of the seven cuts 13, the seal section 10 is provided with eight finger-like members 14, each of which is approximately 5 cm in width and approximately 5 cm in length (other suitable widths and lengths of the finger-like members are also considered to be within the scope of the present invention). Each seal section 10 may also include elongated slots 15 through which mounting hardware may be inserted as described below.

FIG. 2 illustrates the operational relationship of a seal section 10 of an embodiment of the present invention, a windbox and a rotating cylinder of a rotary kiln. A portion of a rotating cylinder of the rotary kiln is shown at reference numeral 16 and a portion of a windbox of the rotary kiln is shown at reference numeral 17. The seal section 10 is attached to the windbox 17 by suitable attaching means, such as a bolt 18 and a nut 18' (other suitable means for attaching the seal section 10 to the windbox 17 may be employed as an alternative to the bolt and nut assembly 18 and 18'). In the illustrated embodiments, a bolt 18 extends through each elongated slot 15 provided in each seal section and through a bolt hole (not shown) provided in the windbox. The clearance between each bolt 18 and the edge of the elongated slots 15 allows adjustments to be made to the distance which each seal section 10 extends from the windbox 17. A washer, or plate, 19 may be arranged between the head of the bolt 18 and the seal section 10.

The portion marked 2a of the seal section 10 in FIG. 2 is shown in FIG. 2a. As shown in FIG. 2a, the seal section 10 of the FIG. 2 embodiment includes three layers 20, 21 and 22. Layer 20 comprises a flexible heat resistant and insulating material, such as a ¼-inch thick KAOWOOL layer. Layer 20 is sandwiched between two layers 21 and 22 of spring steel (or other types of heat resistant resilient material).

As shown in the FIG. 2 embodiment, the seal section 10 extends away from the windbox 17 and towards the outer peripheral surface 23 of the rotating cylinder 16. Additionally, as shown in FIG. 2, the seal section 10 bends in one direction (to the right in FIG. 2) as it extends towards the surface 23. The cuts 13 allow the finger-like members 14 of each seal section 10 to spread apart so that each seal section 10 can bend as described above and simultaneously arc around a portion of the rotating cylinder.

The finger-like members 14 of the seal section 10 are arranged to abut against the surface 23 of the rotating cylinder 16. By virtue of the spring forces provided by the spring steel layers 21 and 22 of the seal section 10, the finger-like members 14 urge against the surface 23 of the rotating cylinder 16. In this manner, the section 10 forms a reasonable seal between the windbox 17 and the rotating cylinder 16.

When arranged end to end and attached to the windbox 17, the seal sections 10 operate as a barrier between the hot air surrounding the rotating cylinder 16 and the cooler environment in which the rotary kiln operates. In the FIG. 2 embodiment, the seal sections 10 bend toward the cooler side (the right side) of the kiln and away from the hot side (the left side of the kiln). However, it is within the scope of the present invention to provide seal sections which bends toward the hot side of the kiln.

As the rotating cylinder 16 rotates (generally at a very slow rotational speed), an out-of-round, or uneven, surface 23 will exert uneven forces across the seal sections 10. However, by virtue of the numerous finger-like members 14 provided on each of the seal sections 10, these uneven forces may be accommodated without seriously compromising the seal's integrity. That is, particular forces exerted at one portion of a seal section 10 will cause one or more of the finger-like members 14 to flex a certain degree, while finger-like members 14 located elsewhere on the seal section 10, or other seal sections, will not be effected and, thus, will not flex as a result of such forces. The substantially independent flexing of the numerous finger-like members of each seal section 10 allows the combination of seal sections 10, arranged end to end as described above, to continuously provide a seal against the surface 23, even when the surface 23 is uneven and/or out of round.

FIG. 3 shows another embodiment of the present invention. In FIG. 3, the seal 10 operates similar to the seal described with regard to FIG. 2. However, a support member 24 (such as a steel bar) is provided on the hot side (the left side of FIG. 3) of the seal section 10. The support member 24 may be attached to the windbox by any suitable means such as the same nut and bolt assembly 18 and 18' employed for attaching the seal section 10 to the windbox. The support member 24 extends from the windbox 17 towards the rotating cylinder 16. However, a suitable clearance gap 25 is provided between the support member 24 and the rotating cylinder 16 so as to allow for an uneven or out-of-round surface 23. The support member 24 operates to insure that the seal section 10 does not bend toward, get sucked into or get blown out of, the hot side of the rotary kiln.

Figure 4:
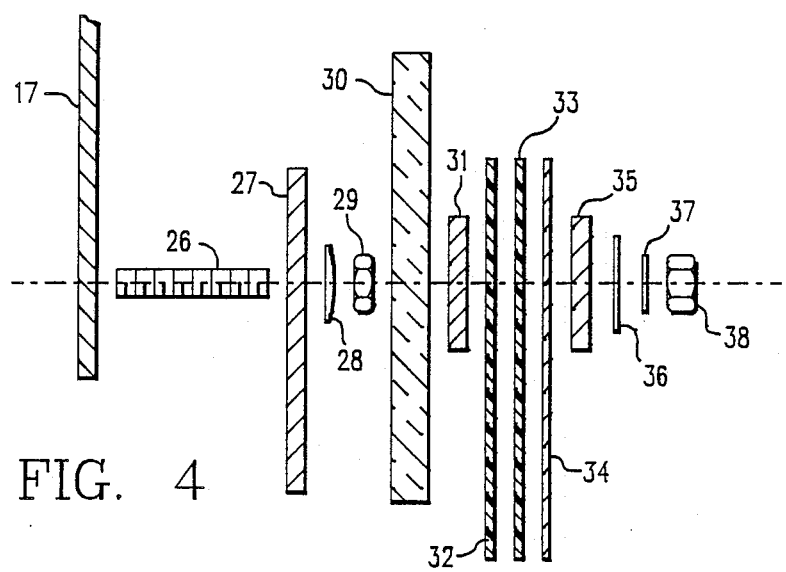
FIG. 4 is an exploded cross-sectional view of a radial seal according to another embodiment of the present invention.

FIG. 4 shows an exploded view of another embodiment of a seal section 10. The FIG. 4 embodiment includes several layers of materials and hardware mounted by a threaded stud 26 onto the windbox 17. The threaded stud 26 may be secured to the windbox 17 by any suitable means such as a threaded hole in the windbox 17. A support member 27 similar to that shown at reference numeral 24 in FIG. 3 is provided adjacent the windbox 17. A compression washer 28 is arranged next to the support member 27. Reference numeral 29 designates a threaded lock nut which is arranged to compress the compression washer 28 and secure the support member 27 to the windbox 17. A layer of insulation material 30, such as a layer of KAOWOOL, or KAOWOOL wrapped in a metal mesh, is arranged adjacent the lock nut 29. Reference numeral 31 designates a first retainer member, such as a metal plate or bar which is mounted next to the layer 30. Two layers of a synthetic resin polymer, such as TEFLON (trademark), 32 and 33 are provided adjacent the first retainer member 31. A layer of spring steel 34 is arranged next to the two TEFLON layers. A second retainer member 35 is arranged next to the layer of spring steel 34 so that the two layers of TEFLON 32 and 33 and the layer of spring steel 34 are sandwiched between the first and second retainer members 31 and 35. A flat washer 36, a lock washer 37 and a threaded nut 38 are arranged on the stud 26 after the layers and hardware 27–35 so as to secure the layers and hardware to the windbox 17. Each of the layers 20, 21 and 22 of the FIG. 2 embodiment and each of the layers 32, 33 and 34 of the FIG. 4 embodiment of the seal section 10 may be provided with cuts or slits to form finger-like members as shown and described with regard to FIG. 1.

Figure 5:
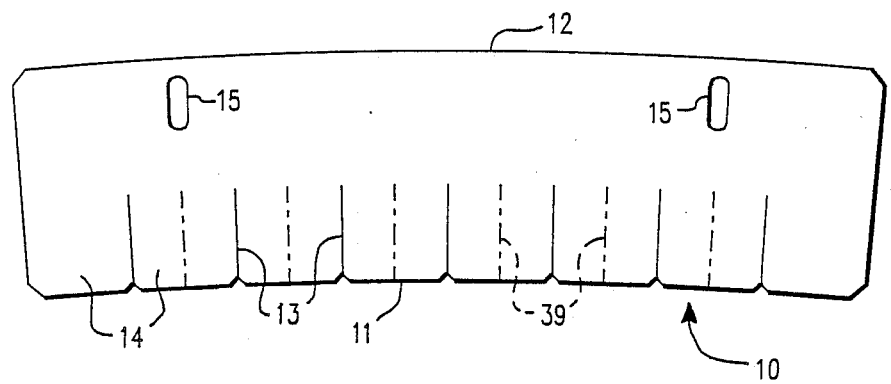
FIG. 5 is a front view of a section of the radial seal according to an embodiment of the present invention.

The above-described radial seal embodiments may be provided with overlapping finger-like members. For example, in the FIG. 5 embodiment, several layers of each multilayer seal section may be provided with finger-like members located at different spacings, or offset, with respect to other layers of the seal. In this manner, as shown in FIG. 5, the finger-like members 14 of one layer overlap and cover the cuts or slits (shown by dashed lines 39) provided in another layer and, thus, overlap the finger-like members of the other layer of the seal. Additionally, this overlapping arrangement insures that separations between the finger-like members of one layer (i.e., caused by the bend in the seal section 10) are covered by the finger-like members of another layer.

Figure 6:
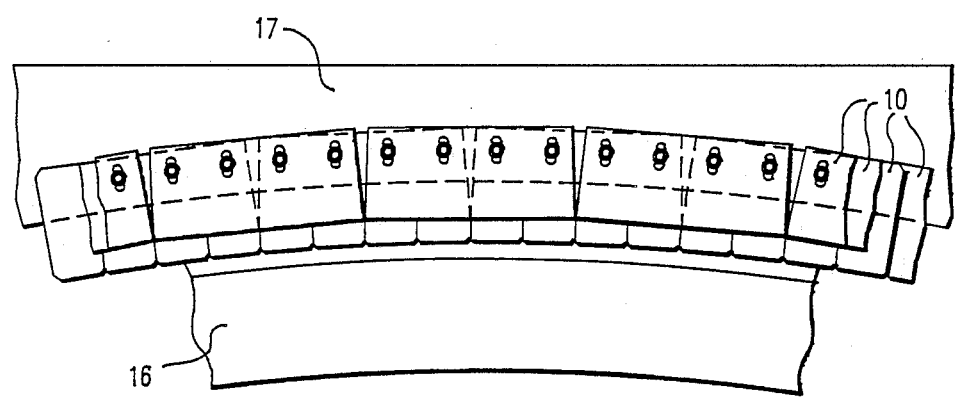
FIG. 6 is a front view of several seal sections arranged according to an embodiment of the present invention.

An overlapping of finger-like members can also be effected by attaching the seal sections to the windbox in an overlapping manner as shown in FIG. 6. In this arrangement, each seal section 10 either overlaps or is overlapped by adjacent seal sections. Additionally, the finger-like members on each seal section either overlap or are overlapped by the cuts or slits in adjacent seal sections. Thus, as shown in FIG. 6, the radial seal is provided with overlapping finger-like members. In this manner, separations between finger-like members (i.e., caused by the bend in the seal sections) are covered by overlapping finger-like members.

In operation, several seal sections 10, as described in the above embodiments, are arranged around the peripheral surface 23 of the rotating cylinder 16. As the rotating cylinder rotates, the seal sections 10 maintain a reasonable and reliable seal between the windbox 17 and the rotating cylinder 16. The seal sections 10 each include several finger-like portions 14 which operate to press against the surface 23 and flex to accommodate for an uneven, or out-of-round, surface 23 of the rotating cylinder 16. Hot air existing on the hot side of the rotary kiln is, thereby, reasonably sealed from escaping to the cooler environmental atmosphere existing on the cool side of the rotary kiln.

The radial seals thus far described are low cost, long life devices which provide reasonable low positive and negative pressure seals at high temperatures. The seals operate by applying a substantially even and constant force across the outer peripheral surface of a rotating cylinder. The seals also accommodate for an uneven, or out-of-round, outer peripheral surface of a rotating cylinder. The radial seals are easily installed and replaced. Furthermore, the seals are not susceptible to the mechanical problems, such as the tendency to collect dirt particles, which are responsible for the failure of known rotary kiln seals.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A radial seal in combination with a rotatable cylinder having a sealing surface and a stationary windbox of a rotary kiln, the radial seal comprising:
    a plurality of seal sections, each seal section having two opposed ends, said seal sections being disposed, with an end of one seal section adjacent an end of another seal section, about the sealing surface of the rotatable cylinder, each seal section further having a plurality of resilient finger-like members; and
    securing means for securing said seal sections to the windbox with said plurality of finger-like members being arranged to abut and press against the sealing surface of the rotatable cylinder.

2. A radial seal as claimed in claim 1 wherein each seal section comprises a sheet of layered materials having a first layer of resilient material and a layer of heat insulating material.

3. A radial seal as claimed in claim 2 wherein each seal section further comprises a second layer of resilient material, and said layer of heat insulating material is disposed between said first and second layer of resilient material.

4. A radial seal as claimed in claim 3 wherein said resilient material comprises spring steel.

5. A radial seal as claimed in claim 1 wherein each seal section comprises a plurality of layers and wherein a plurality of said layers of each seal section have finger-like members.

6. A radial seal as claimed in claim 5 wherein said finger-like members of at least one layer of each seal section are offset with respect to and overlap said finger-like members of at least one other layer.

7. A radial seal as claimed in claim 1 wherein said seal sections are provided in an overlapping arrangement with a portion of each seal section overlapping a portion of an adjacent seal section.

8. A radial seal as claimed in claim 7 wherein finger-like members of said overlapping portion of said seal sections are offset with respect to and overlap finger-like members of said overlapped portion of said adjacent seal sections.

9. A radial seal device as claimed in claim 1 wherein each seal section comprises:
   a layer of heat insulating material;
   a layer of spring steel; and
   at least one layer of a synthetic resin polymer.

10. A radial seal device as claimed in claim 1 further comprising retaining means for retaining said seal sections from bending in one direction.

* * * * *